United States Patent Office 2,826,612
Patented Mar. 11, 1958

2,826,612
PREPARATION OF UREA CRYSTALS

Klaas Over and Leonardus J. Rothkrans, Geleen, Netherlands, assignors to Stamicarbon N. V., Heerlen, Netherlands No Drawing. Application January 3, 1956
Serial No. 556,828

Claims priority, application Netherlands January 14, 1955

6 Claims. (Cl. 260—555)

The present invention relates to the preparation of urea crystals from a highly concentrated solution by the process employing a crystallizing vessel or a number of such vessels connected in series and a device, e. g. a bladed shaft for stirring and transporting the solution along the vessel or vessels. In this process the highly concentrated solution is fed in at one end of the crystallizing vessel or of the first of the series of vessels, and crystallization occurs and the water present is evaporated by the heat of crystallization developed as the solution is propelled forward, so that eventually a dry crystal mass is formed which is further transported through the vessel(s) to discharge.

In this manner a very fine product is obtained which shows strong caking properties upon storage.

Accordingly, it is an object of the present invention to reduce the caking tendency of urea crystals.

It is an additional object to obtain urea crystals of larger size than those obtained by prior art procedures.

Still further objects and the entire scope of applicability of the present inveniton will become apparent from the detailed description given hereinafter; it should be understood, however, that the detailed description and specific examples, while indicating preferred embodiments of the invention, are given by way of illustration only, since various changes and modifications within the spirit and scope of the invention wil become apparent to those skilled in the art from this detailed description.

It has now been found that considerably larger crystals are obtainable if the crystallizing solution contains sufficient frothing agent that at the place where the evaporation of water by the heat of crystalization is taking place the vessel (or each vessel) is filled with a slowly-flowing, thickly-frothing crystal mass. This slowly-flowing, thickly-frothing mass on reaching the point where nearly all the water present has evaporated, is converted rather suddenly into a mass of dry crystals (moisture content approximately 0.2%), which are noticeably coarser in size than those obtained if no frothing agent is added.

Accordingly, the present invention is primarly directed to the step, in the preparation of crystalline urea from a concentrated urea solution by stirring and advancing the solution along a crystallizing vessel or a series of such vessels so that water is evaporated and a substantially dry crystal mass is discharged, of adding to the urea solution an agent which causes the said solution to froth, said agent being added in a quantity such that the solution is substantially converted into the form of a thick froth and advances in such form during the evaporation and crystallization.

From tests it has appeared that any surface-active substance which converts the concentrated urea solution into froth may be used as frothing agent. As the urea solution has a slightly alkaline reaction, anion active surface-active substances are particularly suitable. Surface-active substances the frothing property of which is to be ascribed to the cations do not produce any froth with the concentrated urea solution and consequently the addition of such cationic surface-active substances does not result in the formation of coarser crystals.

As anion active surface-active agents there can be employed the water dispersible salts of paraffin sulfonic acids, paraffin sulfuric acids, the addition products of sulfuric acid with olefins, alkyl naphthalene sulfonic acids, alkyl phenol sulfonic acids, alkylbenzene sulfonic acids, alkyl sulfoscuccinic acids, mahogany acids, fatty acids containing at least eight carbon atoms, etc. Generally the sodium salts are employed but there can also be used the potassium, ammonium, triethanolamine and other salts as which are known to function as anion active agents.

Typical examples of anion active agents are sodium dioctyl sulfosuccinate (Aerosol OT), sodium dihexyl sulfosuccinate (Aerosol MA), the sodium salt of oleyl-N-methyl taurine (Igepon T), sodium tetra-decanesulfonate, sodium diisopropyl naphthalene sulfonate (Nekal A), sodium dibutyl naphthalene sulfonate (Nekal BV), sodium alkyl benzene sulfonate having an alkyl group with an average chain length of 10, 14 or 18 carbonate atoms, sodium lauryl sulfate, sodium "lorol" sulfate (the sodium sulfate of a mixture of alkanes having 10 and 14 carbon atoms with an average of about 12), sodium cetyl sulfate, sodium stearate, potassium stearate, sodium oleate, sodium salt of cocoanut fatty acids, sodium palmitate, ammonium oleate, triethanolamine stearate, sodium decylbenzene sulfonate sold commercially as Santomerse D, sodium salt of mahogany acids, Lissapol LS (the sodium salt of the condensation product of oleic acid chloride with P-anisidine sulfonic acid) sodium lignin sulfonate, sodium octadec-9-ene sulfonate, sodium ethyl cyclohexane-P-sulfonate, sodium isopropyl butyl naphthalene sulfonate, sodium butoxy-butyl naphthalene sulfonate, Nacconol NR (sodium alkyl benzene sulfonate in which the average chain length of the alkyl groups is 14 carbon atoms), Santomerse No. 17 (sodium alkyl benzene sulfonate in which the alkyl group contains 10 or 12 carbon atoms) sodium tetradecyl benzene sulfonate, sodium salt of sulfobenzene stearic acid, sodium salt of octylphenyl butyl sulfonic acid, sodium salt of the condensation product of 2 mols 4-butyl phenol with 1 mol of benzaldehyde-2-sulfonic acid, sodium tetra-decyl phenol sulfonic acid, Santomerse 3 (sodium dodecyl benzene sulfonate), Areskap (sodium monobutyl phenylphenol monosulfonate), Aresket (sodium monobutyl-diphenyl disulfonate), Aresklene (disodium dibutyl-phenylphenol disulfonate), sodium heptadecylbenzimina-zole monosulfonate, sodium heptadecylbenziminazole disulfonate, sodium heptadecylindene sulfonate, sodium sulfoethyl ester of oleic acid (made from oleic acid chloride and sodium hydroxyethane sulfonate), sodium sulfoethyl ester of cocoanut fatty acids, sodium sulfophenyl ester of oleic acid, sodium salt of the ethylhexyl ester of o-sulfobenzoic acid, disodium monocetyl monosulfo-succinate, sodium salt of cocoanut fatty acid derivative of N-methyl taurine, sodium salt of oleyl-taurine, sodium oleyl anilide sulfonate, sodium dodecyl-sulfonamido methane sulfonate, sodium sulfonate of hexadecyl benzyl ether, sodium sulfonate of isododecyl-cyclohexylphenyl ether, sodium salt of N,N-diethyl metanilic acid, sodium salt of sulfonated N,N-diamyl-d-naphthylamine sodium N,N-di-(naphthylmethyl) sulfanilate, sodium heptadecylamino-ethan sulfonate, sodium cetyl sulfate, sodium 4-ethyl-heptyl-2-sulfate, sodium salt of sulfated oleic acid, sodium sulfate of sulfated ricinoleic acid, sodium salt of sulfated methyl oleate, sodium oleyl sulfate, sodium heptyl sulfate, sodium sulfate of 3-ethylheptanol-6; sodium sulfate of 3,9-dimethylundecanol-6; sodium sulfate of 3-ethylundecanol-6, sodium sulfate of 2 - methyl - 7-ethyl undecanol-4, sodium sulfate of 5,11-diethylpentadecanol-8, sodium sulfate of di - n - heptadecylcarbinol sulfate, and arylalkylether sulfonates such as

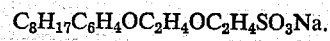

$C_8H_{17}C_6H_4OC_2H_4OC_2H_4SO_3Na$.

By a concentrated solution is meant a solution containing 80% to 97% urea by weight. Preferably, the solution contains 90% to 92% urea.

Good results have been obtained with only a small quantity of frothing agent; 0.01–0.2% by weight of dry frothing agent, calculated on the basis of the amount of urea fed to the crystallizing vessels being preferred. However, from 0.005% to 1% of frothing agent by weight based on the urea can be added.

The frothing agent can be introduced into the crystallizing vessel in the form of an aqueous solution of such a concentration by weight that the urea concentration of the mixture with the urea solution is between 80 and 97%.

Examples I–VII show the influence of various frothing agents, and Example VIII shows a result obtained without using a frothing agent. A comparison of Example VII with Example VIII shows that the use of the cation active agent in Example VII gives virtually no increase in particle size of the urea crystals. All of the anion active agents of Examples I–VI gave substantial increases is particle size, however.

*Example I*

Into a crystallizing vessel—length 4 m. capacity 1.2 cu. m.—provided with a bladed shaft, urea was fed at the rate of 400 kg. per hour, in the form of a 90% aqueous solution. The vessel was thus filled to about ⅔ of its capacity. The bladed shaft rotated at 77 R. P. M. Furthermore, there was fed into the crystallizing vessel an amount of 3.2 kg. per hour of a 20% solution of the sodium salt of an alkyl-aryl-sulfonic acid, specifically sodium decyl benzene sulfonate (obtainable commercially under the name of "Santomerse D"). By this addition a large part of the crystallizing vessel was filled with a thickly-frothing, slowly-flowing mass. At a discharge end dry and relatively coarse isometric crystals were discharged from the crystallizing vessel, their size being determined by screen analysis. It was found that:

38.5% of the crystals was over 1 m., while 41% was between 0.5 and 1 mm., 15.5% was between 0.3 and 0.5 mm., 3.0% was between 0.2 and 0.3 mm., 2.0% was between 0.1 and 0.2 mm.

*Example II*

The procedure followed was identical to that described in Example I, the only difference being that only 1 kg. of a 20% "Santomerse D" solution was added.

The result of the screen analysis is given in the table following the examples.

*Example III*

The procedure of Example I was followed, but instead of a "Santomerse D" solution, 1.5 kg. of a 4% solution of a sodium-sulfate ester of a secondary alcohol specifically with at least 8 carbon atoms and marketed under the name "T-pol-" was added.

*Example IV*

The procedure of Example I was followed except that the frothing agent was a 20% sodium-stearate solution which was added in an amount of 1.8 kg. per hour.

*Example V*

The procedure of Example I was followed except that the frothing agent consisted of a 16% solution of the sodium-sulfate ester of lauryl alcohol (marketed under the name "Sulfaminal"), which was added in an amount of 1.65 kg. per hour.

*Example VI*

The procedure of Example I was followed save that the frothing agent consisted of a 14% solution of a sodium-alkyl sulfonate specifically the sodium sulfonate of the hydrogenated $C_{14}$–$C_{18}$ fraction obtained in the Fischer-Tropsch synthesis (marketed under the name "Mersolat"), which was added in an amount of 1.5 kg. per hour.

*Example VII*

The procedure of Example I was followed save that instead of a "Santomerse" solution, a 13.5% solution of lauryl pyridinium chloride (marketed under the name L. P. C.), was added in an amount of 2 kg. per hour. This agent produced no froth in combination with the concentrated solution of urea.

*Example VIII*

The procedure of Example I was followed but without adding a frothing agent.

The screen analysis of the crystal masses obtained in the preceding examples are listed in the following table.

| Frothing Agent | Example No. | Percent of frothing agent added, calculated on urea present | Percent of frothing agent in the aqueous solution added | Screen analysis in mm. | | | | |
|---|---|---|---|---|---|---|---|---|
| | | | | 1 | 1.0–0.5 | 0.5–0.3 | 0.3–0.2 | 0.2–0.1 |
| "Santomerse" | I | 0.16 | 20 | 38.5 | 41 | 15.5 | 3 | 2 |
| Do | II | 0.05 | 20 | 30.5 | 45 | 19 | 3.5 | 2 |
| "T-pol" | III | 0.015 | 4 | 37.5 | 49 | 12 | 1.5 | |
| Sodium-stearate | IV | 0.09 | 20 | 46 | 48 | 5.5 | 0.5 | |
| "Sulfaminal" | V | 0.066 | 16 | 53.5 | 38 | 7 | 1.5 | |
| "Mersolat" | VI | 0.05 | 14 | 38 | 39 | 15.5 | 5 | 2 |
| "L. P. C." | VII | 0.07 | 13.5 | 0.5 | 23 | 51 | 16.5 | 8 |
| Blank Test | VIII | | | 2 | 22 | 46 | 16 | 13 |

We claim:

1. In the preparation of urea crystals from an aqueous solution of urea containing 80–97% of urea by stirring and advancing the solution along a crystallizing vessel in which the water is evaporated and a substantially dry crystal mass of urea is discharged, the improvement comprising adding to the urea solution from 0.005 to 1% of an anion-active, surface-active agent as a frothing agent and thereby converting the solution to a thick froth.

2. A process according to claim 1 wherein the frothing agent is added in an amount of from about 0.01 to 0.2% by weight of the dry agent calculated on the amount of urea to be crystallized.

3. A process according to claim 1 wherein the frothing agent is a water soluble salt of a higher alkylaryl sulfonic acid.

4. A process according to claim 1 wherein the frothing agent is a water soluble salt of a sulfate ester of a long chain secondary alcohol.

5. A process according to claim 1 wherein the frothing agent is a water soluble soap of a long chain fatty acid.

6. A process according to claim 1 wherein the frothing agent is a water soluble salt of a higher alkyl sulfonic acid.

References Cited in the file of this patent

UNITED STATES PATENTS 2,541,248    Hibbs    Feb. 13, 1951
2,676,955    Weitkamp et al.    Apr. 27, 1954

FOREIGN PATENTS 443,795    Great Britain    Mar. 6, 1936